US011160340B2

(12) United States Patent
Kovtun et al.

(10) Patent No.: US 11,160,340 B2
(45) Date of Patent: Nov. 2, 2021

(54) AUTONOMOUS ROBOT SYSTEM

(71) Applicant: TRAVELMATE ROBOTICS, INC., Las Vegas, NV (US)

(72) Inventors: Leonid Kovtun, Las Vegas, NV (US); Maximillian Kovtun, Las Vegas, NV (US); Leonid Ryzhenko, San Francisco, CA (US); Taras Yermakov, Las Vegas, NV (US)

(73) Assignee: Travelmate Robotics, Inc., Las Vegas, NV (US)

( * ) Notice: Subject to any disclaimer, the term of this patent is extended or adjusted under 35 U.S.C. 154(b) by 695 days.

(21) Appl. No.: 16/032,035

(22) Filed: Jul. 10, 2018

(65) Prior Publication Data
US 2019/0008248 A1  Jan. 10, 2019

Related U.S. Application Data

(63) Continuation-in-part of application No. PCT/US2017/057319, filed on Oct. 19, 2017, and a
(Continued)

(51) Int. Cl.
*A45C 5/14*  (2006.01)
*G05D 1/00*  (2006.01)
(Continued)

(52) U.S. Cl.
CPC .................. *A45C 5/14* (2013.01); *A45C 5/03* (2013.01); *A45C 15/06* (2013.01); *G05D 1/0016* (2013.01);
(Continued)

(58) Field of Classification Search
CPC ......... A45C 13/00; A45C 13/42; A45C 15/00; A45C 15/06; A45C 5/00; A45C 5/03;
(Continued)

(56) References Cited

U.S. PATENT DOCUMENTS

| 2002/0017411 A1* | 2/2002 | Weiss .................... B62B 5/0026 |
| | | 180/168 |
| 2011/0098874 A1* | 4/2011 | Choi ...................... B25J 9/1664 |
| | | 701/26 |

(Continued)

FOREIGN PATENT DOCUMENTS

CN  106379409 A  *  2/2017

OTHER PUBLICATIONS

International Search Report and Written Opinion issued in corresponding PCT Application No. PCT/US18/41525 dated Sep. 19, 2018, 14 pages.

*Primary Examiner* — Charles J Han
(74) *Attorney, Agent, or Firm* — Rahman LLC

(57) ABSTRACT

A system for identifying and following a moving electronic device, the system includes an antenna for receiving a transmitting signals, a plurality of sensors for distance measurement, a processor, and a memory in communication with the processor. The memory storing instructions that, when executed by the processor, cause the processor to determine a speed and a direction of the moving electronic device; adjust a movement path of the system based on the determined speed and direction of the moving electronic device; determine a distance between the moving electronic device and the system; command the system to follow the moving electronic device within a predetermined range of the distance while identifying and avoiding an obstacle in the movement path of the system.

20 Claims, 8 Drawing Sheets

Related U.S. Application Data continuation-in-part of application No. 15/725,656, filed on Oct. 5, 2017, now abandoned.

(60) Provisional application No. 62/530,744, filed on Jul. 10, 2017, provisional application No. 62/651,023, filed on Mar. 30, 2018.

(51) Int. Cl.
    *G05D 1/02*     (2020.01)
    *A45C 15/06*     (2006.01)
    *A45C 5/03*     (2006.01)

(52) U.S. Cl.
    CPC ......... *G05D 1/0088* (2013.01); *G05D 1/0242* (2013.01); *G05D 1/0246* (2013.01); *G05D 1/0255* (2013.01); *G05D 1/0272* (2013.01); *G05D 1/0285* (2013.01)

(58) Field of Classification Search
    CPC .......... A45C 5/14; G05D 1/00; G05D 1/0011; G05D 1/0016; G05D 1/0088; G05D 1/02; G05D 1/021; G05D 1/0231; G05D 1/0242; G05D 1/0246; G05D 1/0255; G05D 1/0268; G05D 1/0272; G05D 1/0276; G05D 1/0285
See application file for complete search history.

(56) References Cited

U.S. PATENT DOCUMENTS

2014/0277841 A1\* 9/2014 Klicpera .............. A45C 13/385
                                                                                                                           701/2
2017/0108860 A1\* 4/2017 Doane .................. G05D 1/0212

\* cited by examiner

US 11,160,340 B2

AUTONOMOUS ROBOT SYSTEM

CROSS-REFERENCE TO RELATED APPLICATION(S)

This application claims priority to and the benefit of U.S. Provisional Application No. 62/651,023, filed on Mar. 30, 2018, and is a continuation-in-part (CIP) of PCT Application No. PCT/US17/57319, filed on Oct. 19, 2017, and is a continuation-in-part (CIP) of U.S. patent application Ser. No. 15/725,656, filed on Oct. 5, 2017, which claims priority to and the benefit of U.S. Provisional Application 62/530,744, filed on Jul. 10, 2017, the entire contents of all of which are incorporated herein by reference.

FIELD OF THE INVENTION

The present invention is generally directed to robotics, and pertains particularly to methods and apparatus for locating a moving target, following the moving target while detecting and avoiding obstacles that are on its movement path.

BACKGROUND

People often travel with some items, such as a bag or a suitcase. These items come in different sizes, as some of them can be heavy and bulky, making them too difficult to handle. Oftentimes, people lose their bags or suitcases during travel, which is a stressful situation for most travelers. Thus, a solution for traveling with heavy or bulky items safely and securely has been long sought by people. An autonomous robot system that locates and follows its user provides security and adapts to different environments.

Previous solutions for an autonomous robot system that locates and follows its user include tracking a target based on a camera vision solution, which only worked when there was only one person present in the area where the camera or the video covered because the system that solely relies on visual image has difficulty with differentiating the targeted user from a crowd of similarly dressed people, or people who look alike. Additionally, tracking via camera or video requires large computing powers and potentially may cause security issues. Other solutions to follow a target include sound tracking, heat sensors, RFID and Bluetooth technology. Tracking via sound seems to be impractical because it would require constantly emitting a sound that the system program recognizes. Tracking via heat sensors becomes unreliable when the system is in an environment where multiple heat sources, e.g., more than one person, or animals are within range. RFID and remote control technology only works when the target is directly visible to the device. The currently available solutions that use Bluetooth technology face three issues. First, a person's body can weaken and spread out a Bluetooth signal. Second, there is a very large amount of signal reflection from Bluetooth device itself and the signal is heavily dependent on the position of the source, such as a phone with Bluetooth signal. Third, whenever the Bluetooth device changes position, the signal changes all of its parameters, making it difficult to determine the speed of the system and the moving target, and the distance between them.

SUMMARY

A system for identifying and following a moving electronic device, in some embodiments, the system includes an antenna for receiving transmitting signals; a plurality of sensors for distance measurement; a processor; and a memory in communication with the processor. In some embodiments, the memory storing instructions that, when executed by the processor, cause the processor to: determine a speed and a direction of the moving electronic device; adjust a movement path of the system based on the determined speed and direction of the moving electronic device; determine a distance between the moving electronic device and the system; command the system to follow the moving electronic device within a predetermined range of the distance; identify an obstacle in the movement path of the system; command the system to stop for a predetermined time period when the obstacle is identified; determine whether the obstacle is still in the movement path of the system after the predetermined time period; adjust the movement path of the system, when determining the obstacle is still in the movement path of the system; and command the system to continue to follow the moving electronic device within the predetermined range of the distance, when determining the obstacle is no longer in the movement path of the system.

In some embodiments, the system includes Bluetooth pairing with the moving electronic device and following only the moving electronic device after Bluetooth pairing.

In some embodiments, the system may include a camera equipped to perform object recognition to identify the obstacle and transmit an object recognition signal.

In some embodiments, the command to stop the system is based on a predetermined threshold of distance between the system and the obstacle.

In some embodiments, the system includes an engine controller equipped to perform system movement command.

In some embodiments, the processor command the system to follow the moving electronic device within a predetermined range of the distance based on the speed and direction of the movement of the system.

In some embodiments, the processor commands the system to increase system movement speed when the system is being physically pulled at a predetermined angle with respect to ground.

In some embodiments, the processor further commands the system to rotate 180 degrees when the moving electronic device is at a predetermined threshold value of the angle with respect to the system.

In some embodiments, the system includes a joystick that controls the movement of the system.

A method for identifying and following a moving electronic device by a system, the method include: determining, by a processor, a speed and a direction of the moving electronic device; adjusting, by the processor, a movement path of the system based on the determined speed and direction of the moving electronic device; determining, by the processor, a distance between the moving electronic device and the system; commanding, by the processor, the system to follow the moving electronic device within a predetermined range of the distance; identifying, by the processor, an obstacle in a movement path of the system; commanding, by the processor, the system to stop for a predetermined time period when the obstacle is identified; determining, by the processor, whether the obstacle is still in the movement path of the system after the predetermined time period; adjusting, by the processor, the movement path of the system, when determining the obstacle is still in the movement path; and commanding, by the processor, the system to continue to follow the moving electronic device within the predetermined range of the distance, when detecting the obstacle is no longer in the movement path of the predetermined time period.

DETAILED DESCRIPTION

Figure 1:
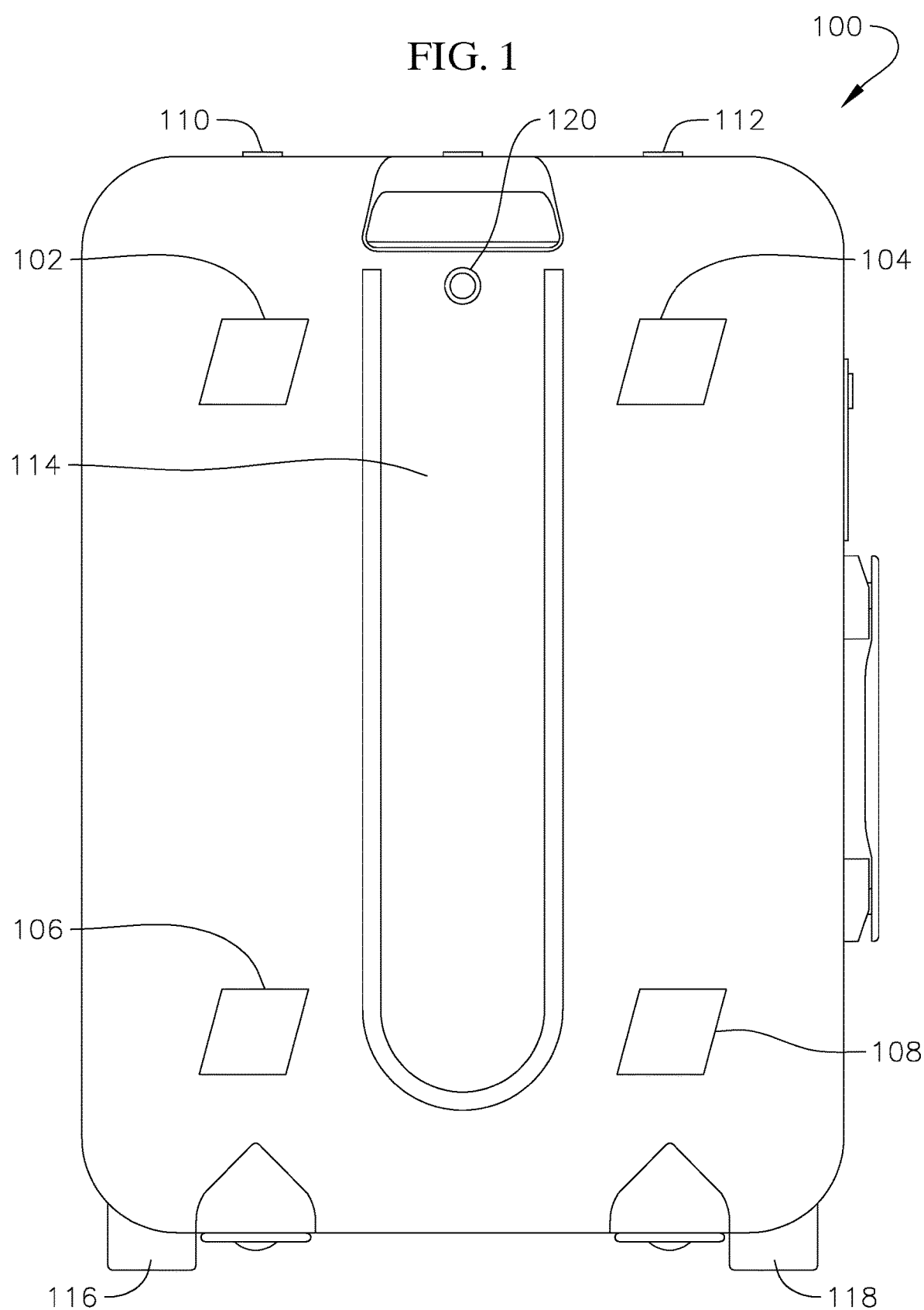
FIG. 1 is a front view of an autonomous robot system in accordance with some embodiments of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further medications in the described embodiments, and any further modifications in the described embodiments and any further applications of the principles of the invention as described herein are contemplated as would normally occur to one skilled in the art to which the invention relates.

An autonomous robot system, for example, a suitcase, a bag, a cargo, a stroller, a carriage, a container and similar items with wheels ("system"), locates a target, for example, an electronic device, such as a smart phone, a laptop, or a notepad being carried by a user, and follows the target while it detects and avoids obstacles that are in its moving path. The system wirelessly connects with the target, e.g., a handheld electronic device such as a smart phone, and exclusively "pair-up" with the target in order to follow the target as it moves. The system navigates through large crowds recognizing and avoiding objects that are in its way while target path tracking. In some aspects, the system is able to move through crowds and obstacles without requiring any extra peripherals. In some aspects, the autonomous robot system includes omni wheels that allow for multi-directional movement, including vertically and horizontally and better stability. While following the moving target, the system moves at a speed that is within a predetermined threshold of the target's moving speed.

The system patrols its environment using cameras or recorders. In some aspects, the camera or recorder can be controlled remotely. In some aspects, the system includes location recognition application, e.g., to a global position system ("GPS") chip, to orient and track its location. In some aspects, the GPS chip is removable. In some aspects, the system may include two additional GPS chips. In some embodiments the system uses artificial intelligence (AI) and machine learning to optimize its movements. The system may include integrated adaptive AI that recognizes its environment, e.g., on a flying aircraft, and adjusts its movement accordingly. The system may include virtual reality (VR) and camera integration, which may be used to reconstruct images of the system's moving path. The system may also include directional indicators, e.g., speakers for guiding visually impaired user.

FIG. 1 is a front view of an autonomous robot system in accordance with some embodiments of the disclosed invention, 100. The basic components of the system 100 may include: directional antennas 102, 104, 106, 108; distance measuring sensors 110, 112, a processor and memory 114, and wheels 116, 118. The system may include a User's Transmitter Detecting module, which include specially designed directional antennas 102, 104, 106, 108, and Bluetooth Low Energy modules, which include algorithms for data processing. The directional antennas 102, 104, 106, 108 detect its target by searching for the target's wireless signal transmitter, e.g., smartphone, smart watch, or electronic wrist bracelet. The strength differences of the signals received by the directional antennas 102, 104, 106, 108 are utilized to determine the distance and angle of the target with respects to the system, e.g., the sectoral and differential method.

The system may also use distance measuring sensors to detect its target. Choices of the distance sensor include ultrasonic distance measuring sensor and/or laser distance measuring sensors. Additionally, the distance measuring sensors may also be used to detect obstacles, e.g., people, fixtures and buildings that are in the moving path of the system.

The system may locate its target when the target is in its vision range by its visual identification module. As shown in FIG. 1, the visual identification module may include a camera 120. In some embodiments, the system may include a module of visual identification and fixation of targeted human using human image recognition. In some aspects, the module may include at least one camera 120 located at the center of the vehicle's top cover. The module outputs a radian degree from 0° to 170° and become activated when a human is within its vision range set at a predetermined distance, e.g., 25 cm from the ground, and a predetermined angle, e.g., 45° angle. The module also includes an algorithm that processes the image of the targeted human to determine whether the human in range is the prospected target. In some aspects, the camera 120 is equipped to function as a removable 360 degree virtual reality camera.

Figure 2:
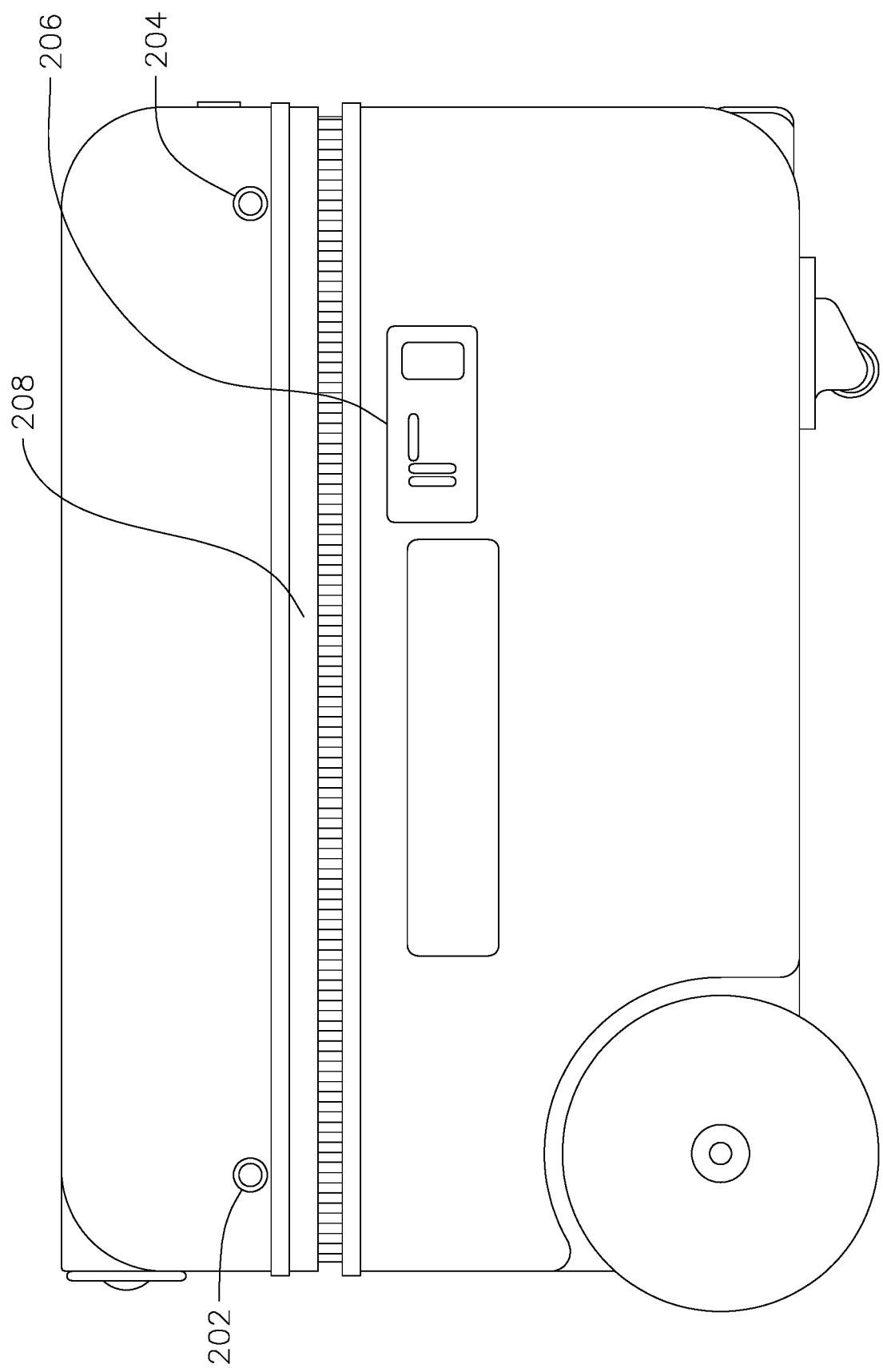
FIG. 2 is a side view of an autonomous robot system in accordance with some embodiments of the present invention.

FIG. 2 is a side view of an autonomous robot system in accordance with some embodiments of the disclosed invention, 200. In some aspects, the system may include multiple ultrasonic distance measuring sensors 110, 112 located on the front of the system, and multiple laser distance measuring sensors 202, 204 on the top of the system. The system may also include a biometric lock system 206, e.g., activated by fingerprint, facial or iris. In some aspects, system may also include mechanism for manual locks.

Figure 3:
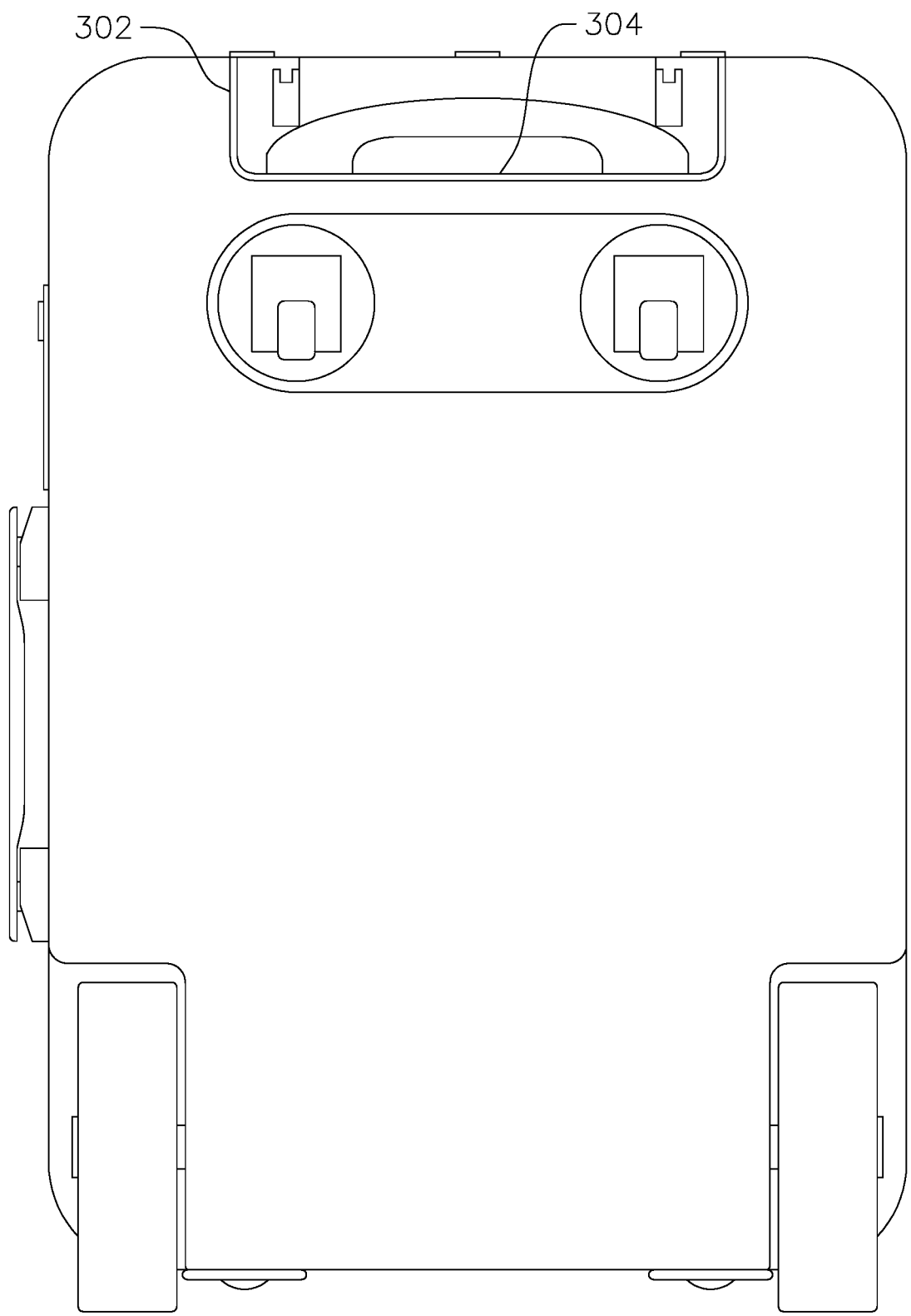
FIG. 3 is a back view of an autonomous robot system in accordance with some embodiments of the present invention.

FIG. 3 is a back view of an autonomous robot system in accordance with some embodiments of the disclosed invention 300. The system includes a notification module such as light indicator and/or sound indicator, for example, the system may include an addressable LED RGB stripe 208. The notification module may also include a speaker 302. The LED RGB stipe 208 and the speaker 302 are configured to provide a variety of light patterns and sound effects. The notification module may not necessarily be autonomous, it may be configured to be activated at various situations, such as when the system is activated from shut off; detection of obstacles in the system's moving path; impossible to bypass an obstacle or an unavoidable obstacle, e.g., when a step is detected; connection breakage; entry into the turn; rotation around the system's axis; and an unexpected removal, e.g., someone attempt to steal the system. Power sources for the system include battery, solar panel and other means for providing long lasting power, one example is a removable battery 304, which may be charged wirelessly.

The system also includes a decision making module, whereas the "decision" is the result of a sequential process by the system's "working components" (pipelines). In some embodiments, the decision making process may include receiving data pertaining to the system engine, e.g., from the odometer, and setting the primary moving speed and angle of the system. The stages of the decision making may include identifying a target, e.g., a handheld electronic device, or a targeted person. The system communicates with the electronic device or utilizing the facial recognition data in getting the target's location information, including angle and distance. The electronic device, for example, a smartphone, smart watch, wrist bracelet etc., is presumably the moving target. The system also calculates the target's speed, and corrects its angle of rotation based on the target's position and sets its moving direction. If the system detects itself as too close or too far from the target, e.g., completely lost connection with the user, the system may stop moving and send a notification to the electronic device which it is following.

The system searches through a list of pre-qualified target/device to establish "pairing." For example, the system may search through a particular person's car, smart phone, smart watch and/or tablet, which may all be "pre-qualified" as a "target" that the system may follow. Once the initial pairing of the targeting device and the system is successful, the paired device is considered a trusted device, as well as the target. From this point on, the system will not pair with any other target unless it receives further command. The system and target connection ends when the system or the target device is turned off.

In some aspects, the system establishes the exclusive targeting by verifying the identification code exchange between the system and a server and Bluetooth protocol of the target during initial connection. After the first activation of the system and establishing connection with the target, the system proceeds to a calibration process to be chosen optionally by the user in the mobile applications. Different types of single transmitter are likely to have different receiving and transmitting antennas with different characteristics. To be compatible with all types of wireless signal transmitters, an initial calibration for each transmitter with respect to the system is required to level out the effect of different types of signal transmitters for better accuracy in determining the distance and the angle of the system with respect to the target.

Figure 4:
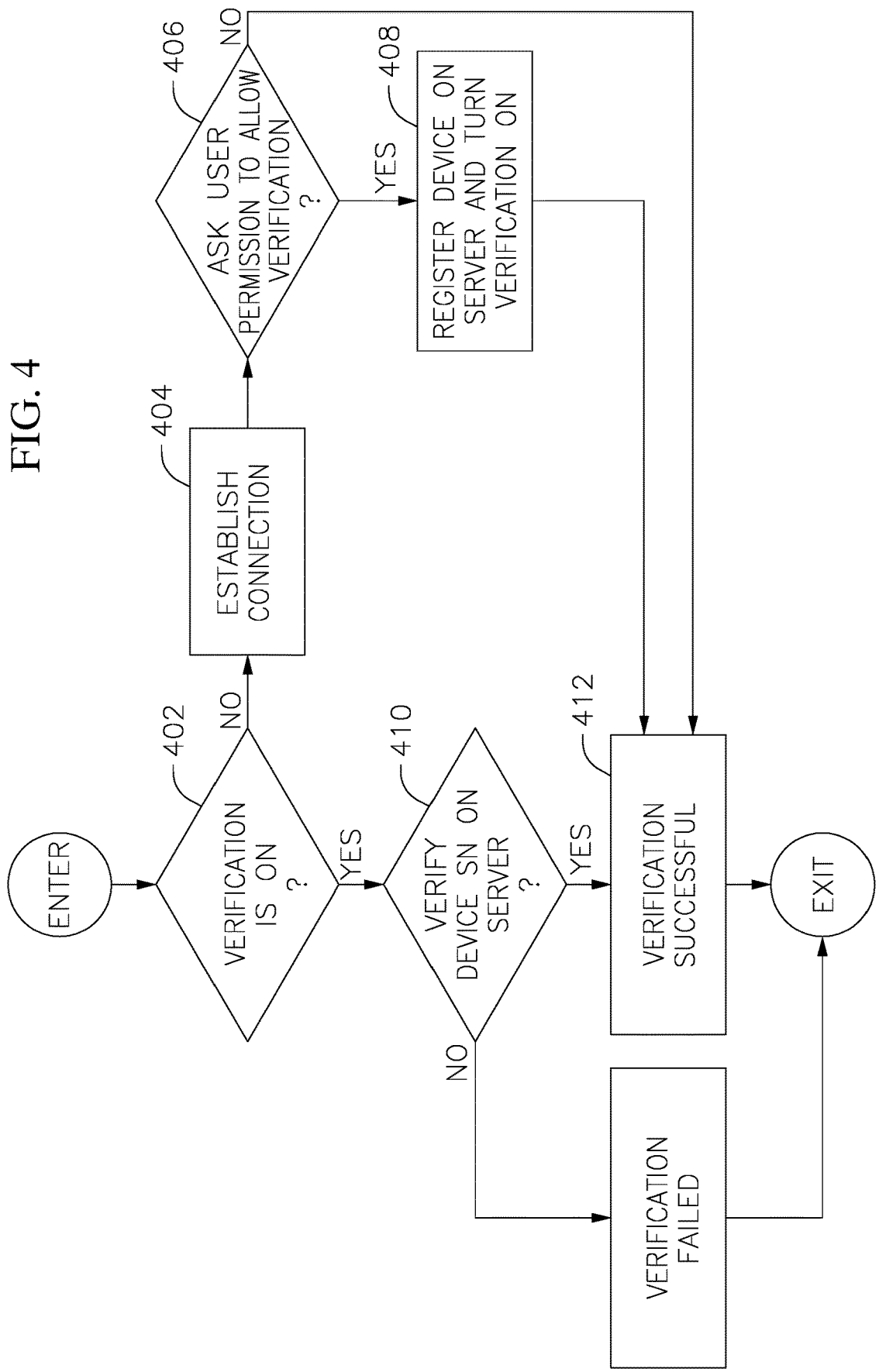
FIG. 4 illustrates a process flow for an autonomous robot system locating a target in accordance with some embodiments of the present invention.

FIG. 4 illustrates a process flow for an autonomous robot system locating a target in accordance with some embodiments of the disclosed invention. The target which the system detects and follows is presumably a wireless electronic device, e.g., smartphone, which is equipped with Bluetooth protocol to be paired with the system. The pairing process can be activated by a user, e.g., via a mobile application that was previously downloaded on the wireless electronic device. In some aspects, the system automatically searches for a device to establish "pairing." To avoid the system from following a wrong target, e.g., paring with an undesirable smartphone, the targeted wireless electronic device is registered and verified.

Accordingly, when the system detects a wireless electronic device and determines that device is a possible target in block 402, the system begins the verification process by determining whether the device has already been registered. Each registered target/device has a unique serial number; only the verified registrant target/device can control and monitor the system. A device verification process registers the serial number in a server e.g., a remote user account that is saved in Cloud. As shown in block 410, the system first determines whether the serial number of the device is located on a server, then verifies whether the device associated with the serial number has already been registered in block 412. If the device has not yet been registered, the system then requires the user to confirm during initial connection in block 404, by seeking permission to allow the system to register the device for verification purpose in block 406. If the user grants permission, the system will register the device on the server and run the verification process in block 408. Examples of registration methods include using the email address and/or the phone number that is associated with the smartphone. User permissions include, for example, Bluetooth usage, access to GEO data, etc. In some aspects, the mobile application dashboard is the main application control panel with set of function to control and monitor device. The mobile application may also include an option to link a particular system to the user's account to enhance protection against unauthorized access and theft. The system detects the target location and follows the user while it observes a set distance between it and the user, and maintains optimum speed. As an option, indicating alarms, e.g., lights or sound may come on when the system loses its connection with its target.

Figure 5:
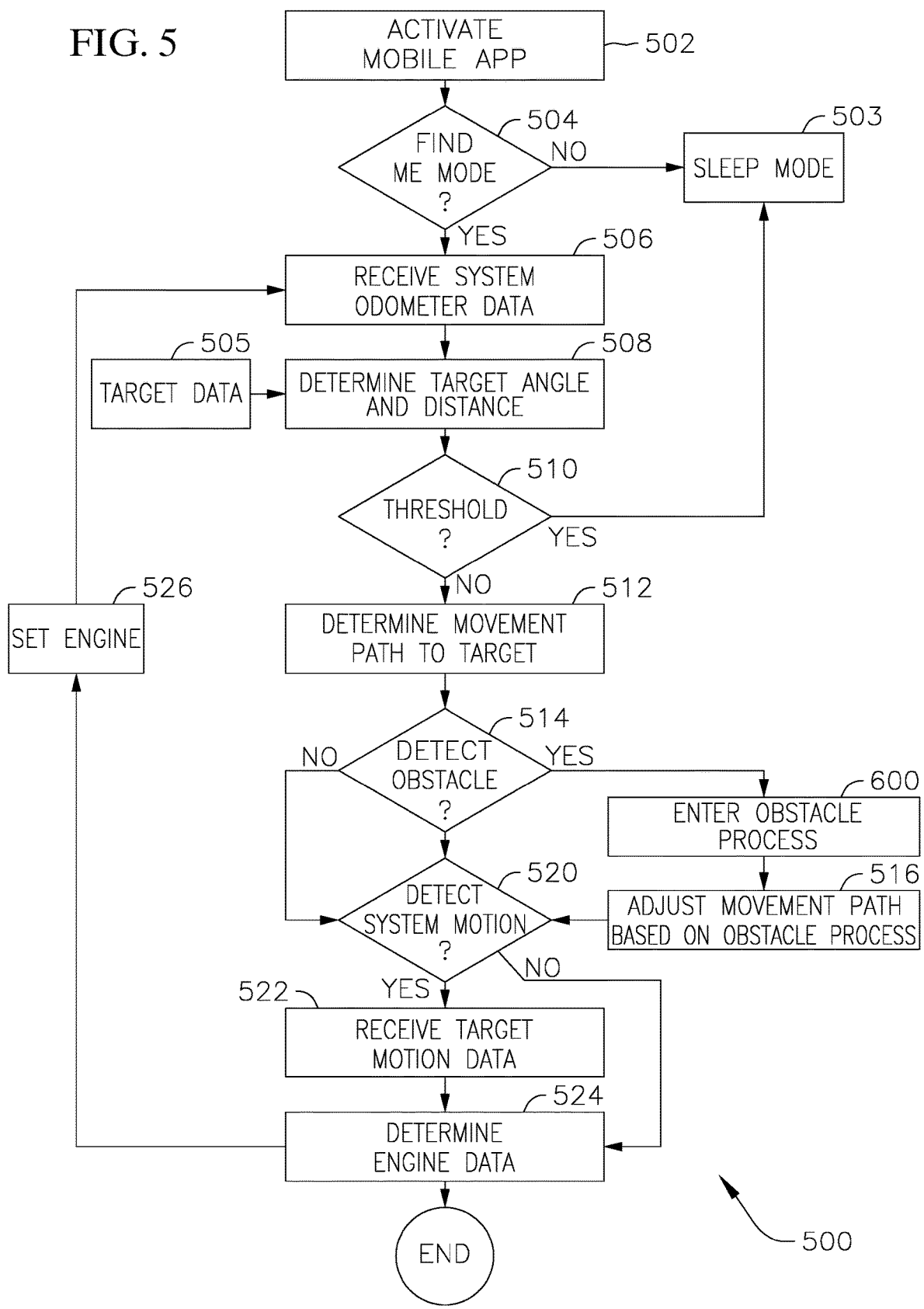
FIG. 5 illustrates a process flow for an autonomous robot system moving towards a stationary target according to some embodiments of the present invention.

FIG. 5 illustrates a process flow for an autonomous robot system moving towards a stationary target, ("Find Me Process"), according to some embodiments of the disclosed invention. In some embodiment, the Find Me Process 500 begins after the system successfully verifies the target, while the target is standing still at its location, the system autonomously travels towards the target until the distance between the system and the target is within a predetermined threshold. In some aspects, the user activates the Find Me process using the mobile application in block 502. During the Find Me Process, the system moves at a predetermined constant speed. In some aspect, the predetermined speed is set by the system user, and it can be changed via mobile application. In some aspects, the system only uses data that it received from the directional antennas, (e.g., directional antennas 102, 104, 106, 108 in FIG. 1) for navigation.

At the beginning of the Find Me process in block 500, the system receives data pertaining to the system engine from the odometer in block 506. The system also receives data pertaining to the position of target in block 505. The system uses both data sets to determine the angle and distance of the target with respect to the system in block 508. The system compares its distance to the target with a predetermined threshold value in block 510 to determine whether to send command to the system engine controller. If the distance to the target is greater than the predetermined threshold value, the system determines the angle and distance to the target in block 512, and sets a movement path which it will take to the target. On the path of traveling towards the target, the system may detect one or more obstacle(s) in block 514. When an obstacle is in the movement path, the system retrieves data pertaining to the position of the obstacle for adjusting its movement path in block 516 from a separate operational process in block 600, and sends command to the system engine controller to adjust its movement accordingly. If the system does not detect any obstacle on the path of traveling towards the target, the system will determine whether the target has moved since it first paired up with the system in block 520, by retrieving data pertaining to the position of the target and comparing the data with the previous target data in block 505. If the target has moved, the system receives target motion data in block 522, which includes the angle and distance to the target. The system analyzes the target motion data and determines the engine data in block 524. The command to the system engine is sent to the engine in block 526 to set the system's next movement by adjusting the system wheel(s)' rotation angle and rotation speed.

When the target is reached, the mode may be automatically turned off and the operational motion managing component, responsible for the operating modes, enters into another mode, for example, the "Sleep" mode, which stops the system from moving. The system comes to a stop following the electronic device and waits for a period of time for the obstacle to disappear, e.g., removed. The wait time period is predetermined based on the specific environment where the system operates. If an insurmountable obstacle (pit or dead end) is detected, an alert, e.g. an alarm or a visual indication such as an LED light or notice, is generated and sent to the mobile application installed on the user's smartphone.

The system travels towards the target until its distance from the target is less than a threshold value. The threshold value is generally an optimal distance, which the system maintains when following the target in motion and may be set by the user.

When the distance between the system and the target is smaller than the threshold value, it is assumed that the system has "reached" its target. The system then stops. In some aspects, the system goes into standby mode after it reaches the target.

Figure 6:
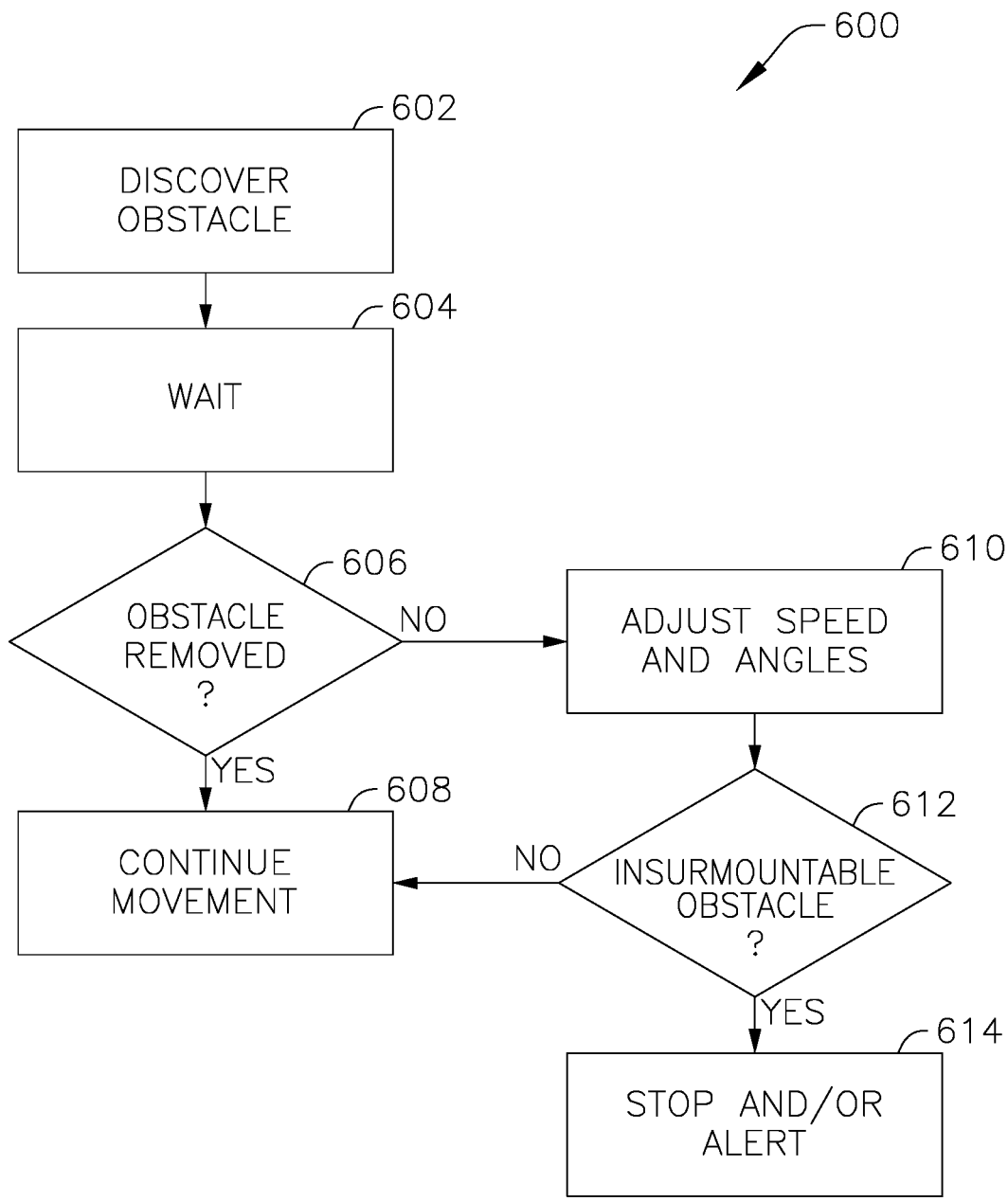
FIG. 6 illustrates a process flow for an autonomous robot system reacting to a discovered obstacle in accordance with some embodiments of the present invention.

FIG. 6 illustrates a process flow 600 for the autonomous robot system reacting to a discovered obstacle in accordance with some embodiments of the disclosed invention. If the system discovers an obstacle in its movement path in block 602, the system stops and waits for a period of time in block 604. Oftentimes, the obstacle is a moving object or a person, which will move away within a short period of time. The length of the wait time in block 604 is predetermined or user selectable based on the specific environment where the system is presumed to be placed. For example, an airport is likely to have more temporary obstacles that "move away" quickly, e.g., people, than permanent obstacles such as road block. Therefore, a user who is in an airport may select to set a shorter wait time as oppose to a user who is on a sidewalk of a street.

The system determines whether the obstacle has been removed from its movement path after the "pause" and continues its movement on the path towards the target in block 608. If the obstacle is still present, the system generates commands to the engine controller that adjust its movement by changing the turn angles and/or the speed of the wheels in block 610. Sometimes, an obstacle may be insurmountable, such as a wall, that even adjusting the wheels does not allow the system to move passed it in block 612. An insuperable obstacle may also be an obstacle that cannot be bypassed by maneuvers available for the system geometry, for example, when the system is on a path which requires it to go up or down on stairs. In this case, the system stops and generates a notification to alert the user of the obstacle, e.g. via an alarm or a notice sent to the user's handheld device in block 614.

Figure 7:
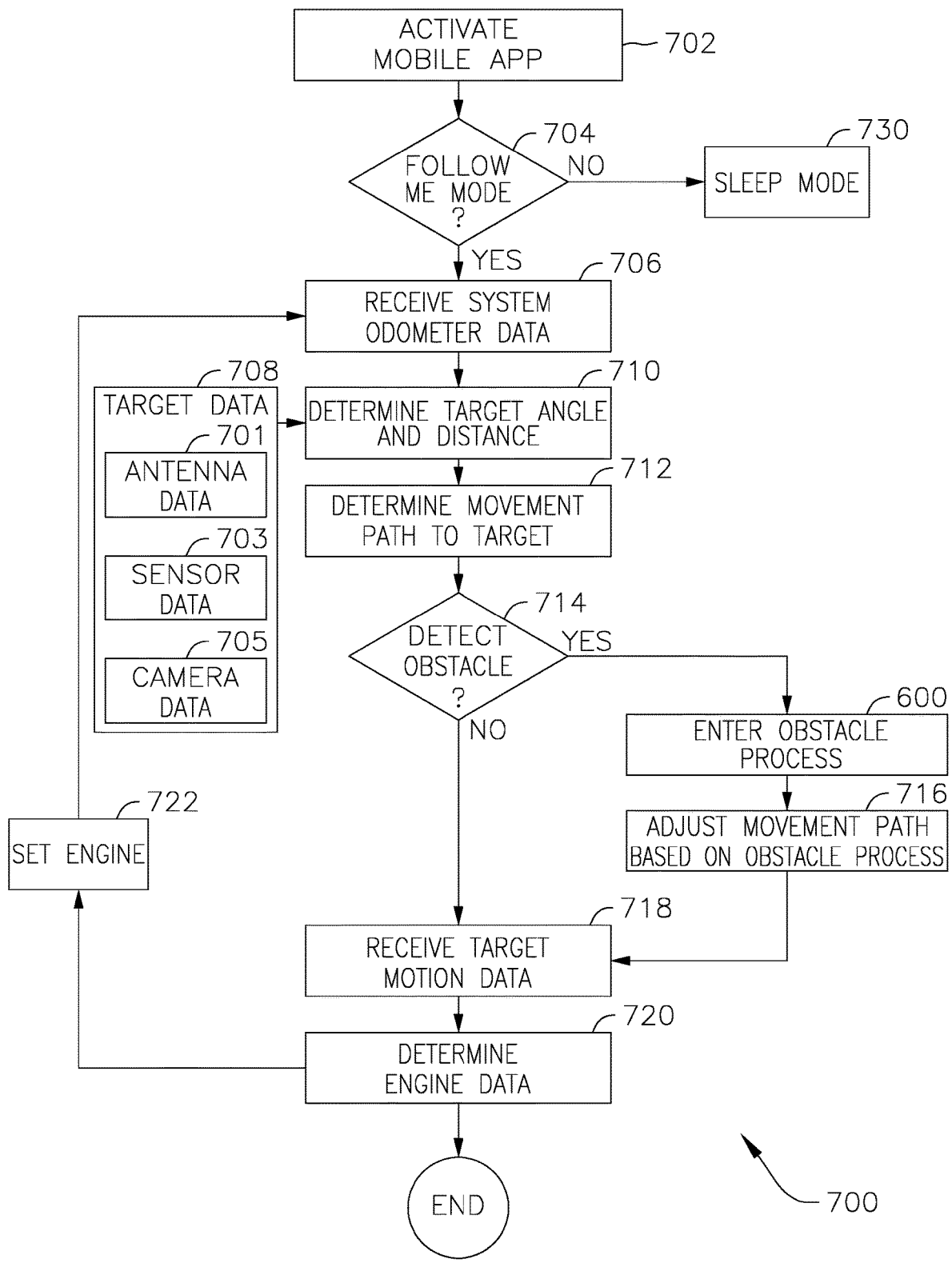
FIG. 7 illustrates a process flow for an autonomous robot system following a moving target according to some embodiments of the present invention.

FIG. 7 illustrates a process flow for an autonomous robot system following a moving target, ("Follow Me Process"), according to some embodiments of the disclosed invention. The Follow Me Process in block 700 begins after the system successfully verifies the target. While the target is moving, the system determines the initial distance between itself and the target, and accelerates towards the target until it is within an optimal distance from the target. The system maintains its speed according to the moving target to stay within the optimal distance. The system analyzes the data collected from all internal components, such as antennas, sensors and/or cameras, and external sources, including the data collected from the user's mobile application, to determine both the moving speed and/or angle of the target. In some embodiments, the Follow Me process utilizes AI and autonomous movement technology to determine the direction and speed of its movements based on the moving speed and/or angle of the target.

According to some embodiments as shown in FIG. 7, the Follow Me Process may be activated by the user using a mobile application in block 702. The Follow Me Process begins by receiving odometer data in block 706 from the system engines. The system collects data from the antenna(s) in block 701, the distance measuring sensors in block 703, and the camera in block 705 to determine the moving target's angle and distance with respect to its position in block 710. In some aspect, the system utilizes the antenna data in block 701 to determine its own movement, specifically its angle and distance with respect to the moving target, and monitors its own driving speed. The antenna(s) detect the direction of motion and the antenna(s) data is sent to the system where it determines the required angle of rotation of the wheels in its future movement in block 710. The distance measuring sensors in block 703 detects the distance between the moving target and the system itself. The sensor(s) data is sent to the system processor where it determines the required driving speed of the wheels in its future movement in block 710. If the system is within a predetermined threshold, the wheels rotate at a constant speed to maintain the optimal distance. The wheels accelerate or slowdown when the distance is too large or too small with respect to the threshold value, respectively. The threshold value is the optimal distance between the system and moving target, which the system maintains while it follows the target. In some aspect, the camera in block 705 identifies the target, and obtains information regarding the distance and angle with respect to the target. The camera data is also sent to the system processor to be used in determining the next motion based on the distance and angle with respect to the target in block 710.

According to some embodiments, the system determines the approximate speed and the angle of the moving target in block 710, and sets a movement path in block 712, which it will take in order to follow the target based on the results of the analysis of data pertaining to the target in block 708, e.g., the target distance, target angle, and the odometer data in block 706.

On the movement path of following the moving target, the system may detect one or more obstacle(s) in block 714. When an obstacle is identified in the movement path, the system retrieves data pertaining to the position of the obstacle for adjusting its movement path in block 716 from a separate operational process, for example the process of FIG. 6, and sends command to the system engine controller to adjust the system's next movement accordingly, for example, a camera may identify an obstacle by object recognition.

The system retrieves target motion data pertaining to the position of the moving target, which include the angle and distance of the target in block 718, determines the engine data by analyzing the target motion data and in 720. The command to the system engine controller is sent in block 722 to set the system's next movement by adjusting the system wheel(s)' rotation angle and rotation speed. The Follow Me process ends when the user terminates the target-following mode, or when the target stops traveling and the system reaches a predetermined distance from the target, e.g., the distance between the system and the target is less than 1 meter.

According to some embodiment of the disclosed invention, the system engine controller may directly control the motor drivers by generating a pulse width modulation ("PWM") control signal of the required duty cycle for the motor driver. In some aspects, upon receiving the command, the system engine controller calculates the required wheel speeds and rotation angle based on the speed and the angle between the system and its target. In some aspects, the engine controller may determine to rotate the wheels backwards so that the system turns around immediately to follow the electronic device based on a pre-determined threshold value of the angle between the system and its target, e.g., when the angle between the system and its target is 180 degrees.

The system process may also include a manual vehicle motion mode, which enables a user to control the movement of the system using a joystick in the mobile application. For example, the user may activate the joystick mode using the mobile application and operate the joystick in multiple sensitivity modes, e.g., Low, Mid, High. During operation, the mobile application sends (x-y) coordinates and a range of [0, 100] to the system processor, upon receiving the coordinates, the system calculates the wheel(s) rotation angle and speed and sends commands to the system engines according to the calculation to control the movement of the wheels(s).

Figure 8:
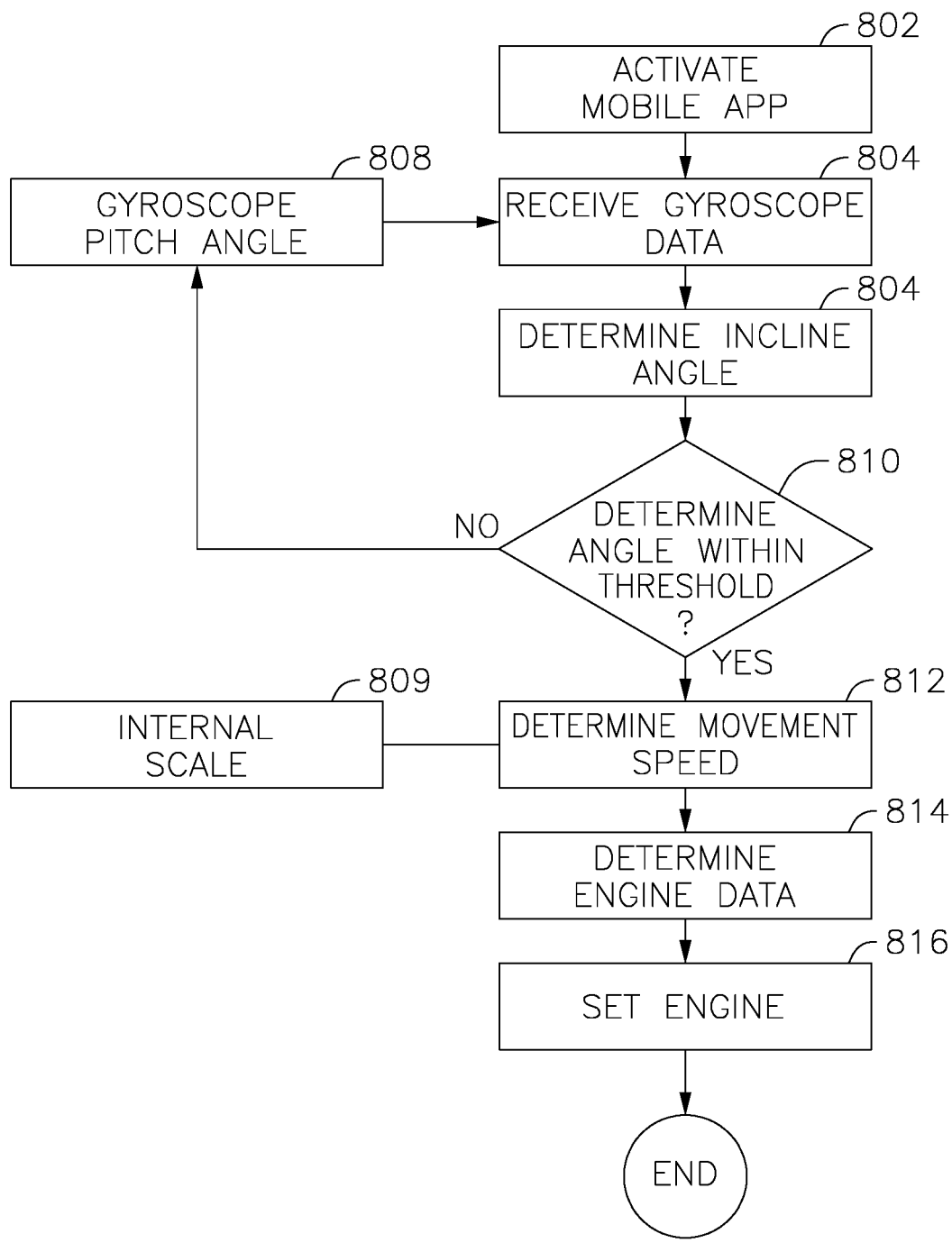
FIG. 8 illustrates a process follow for an autonomous robot system assisting the user in according to some embodiment of the present invention.

FIG. 8 illustrates a process flow for an autonomous robot system assisting the user, ("Assist Me Process"), according to some embodiments of the disclosed invention.

When the system reaches its target, it may be picked up or handled by the user directly. For example, the user may physically pull the system by a handle instead of letting the system follow the user while walking. While the system is being physically pulled by the user, the system's engine may automatically increase its horse power so that the user does not need to pull the entire weight of the system, which assists the user with moving a system that may be too heavy to maneuver. The wheels rotate at an angle according to the direction in which the system is being pulled by the user, while moving in a speed according to an algorithm that is based on the system's inclined angle with respect to the system's movement path, and the system's own weight.

According to FIG. 8, the assistant mode may be activated by a user using the mobile application in block 802. The system is equipped with a gyroscope in block 808 and internal scale in block 809, and monitors the gyroscope data in block 804 to detect the angle of inclination in block 806. The system determines whether the angle of inclination is out of predetermined threshold value, e.g., the system is tilted towards the ground at an angle of 45 degrees in block 810. If the angel is between the system and the ground is within the predetermined threshold, the system determines a necessary movement speed that corresponds to the angle, which does not require the user to use much pulling force to maintain in block 812. The system determines the engine data in block 814 and sends commands to the system engine controller in block 816 to set the system's next movement by adjusting the system wheel(s)' rotation angle and rotation speed.

In some embodiments, the system includes a peripheral platform. The user mobile application that controls the system may also include the user's registration, optional device verification, user permissions and control functions. In some aspects, the targeting device verification may include register and validate the device on a remote server and/or on cloud.

The autonomous robot system may be fully integrated with other software applications to provide additional functions. For example, in some aspects, the system may be integrated with an application that is able to make travel suggestions, airport information, and airport gate information. In some aspects, the autonomous robot system function may be continuously improved through machine learning. For example, the autonomous robot system automatically uploads its own movement data to the autonomous robot system application to perfect the system as operating time increases. However, in some aspects, for purpose of security, the self-learning feature may be disabled as an option.

In some embodiments, the autonomous robot system may carry more items, e.g., another suitcase, on the top of while it is traveling autonomously in horizontal mode. In some embodiments, the autonomous robot system may include a built-in scale that measures the weight of its contents. In some aspects, the autonomous robot system may include a display that displays its total weight. In some aspects, the autonomous robot system may include a unique handle that turns into a portable desk, which may be used for laptops, books, documents and other things. In some aspects, the autonomous robot system may include an easily accessible separate compartment for storages.

It should be noted that the foregoing embodiments are merely intended for describing the technical solution of embodiments of the present invention, but embodiments of the present invention are not limited thereto. Although aspects of embodiments of the present invention are described in detail with reference to the foregoing example embodiments, it should be understood by those of ordinary skill in the art that the technical solution described with reference to the foregoing example embodiments may be modified or equivalent replacements may be made to some of the technical features therein. It will also be apparent to the skilled artisan that the embodiments described above are specific examples of a single broader invention that may have greater scope than any of the singular descriptions without departing from the spirit and scope of the present invention.

The invention claimed is:

1. A system for identifying and following a moving electronic device, the system comprising:
   a plurality of directional antennas for receiving and transmitting signals and Bluetooth low energy modules;
   a plurality of sensors for distance measurement;
   a processor; and
   a memory in communication with the processor, the memory storing instructions therein that, when executed by the processor, cause the processor to:
      determine a speed and a direction of the moving electronic device based on strength differences in Bluetooth signals received by the plurality of directional antennas from the moving electronic device;

adjust a movement path of the system based on the determined speed and direction of the moving electronic device;

determine a distance between the moving electronic device and the system;

command the system to follow the moving electronic device within a predetermined range of the distance;

identify an obstacle in the movement path of the system;

command the system to stop for a predetermined time period, when the obstacle is identified;

determine whether the obstacle is still in the movement path of the system after the predetermined time period;

adjust the movement path of the system, when determining the obstacle is still in the movement path of the system; and command the system to continue to follow the moving electronic device within the predetermined range of the distance, when determining the obstacle is no longer in the movement path of the system.

2. The system of claim 1, wherein the processor further Bluetooth pairs with the moving electronic device and following only the moving electronic device after Bluetooth pairing.

3. The system of claim 2, wherein the processor performs an initial calibration of the system to compensate for different types of Bluetooth transmitter of different moving electronic devices for better accuracy in determining the speed and the direction.

4. The system of claim 1 further comprising a camera to perform object recognition to identify the obstacle and transmit an object recognition signal.

5. The system of claim 1, wherein said command the system to stop is based on a predetermined threshold of distance between the system and the obstacle.

6. The system of claim 1, further comprising an engine controller to control the movements of the system.

7. The system of claim 1, wherein said command the system to follow the moving electronic device within a predetermined range of the distance is based on a speed and a direction of the system.

8. The system of claim 7, wherein the processor further commands the system to increase the speed of the system, when the system is being physically pulled at a predetermined angle with respect to ground.

9. The system of claim 1, wherein the processor further commands the system to rotate a plurality of omni wheels of the system by 180 degrees, when the moving electronic device is at a predetermined threshold value of the angle with respect to the system.

10. The system of claim 1 further comprising a joystick to control the movement of the system.

11. The system of claim 1, wherein the system comprises one or more of a suitcase, a bag, a cargo, a stroller, a carriage, and a container.

12. The system of claim 1, being a suitcase.

13. A method for identifying and following a moving electronic device by a system, the method comprising:

determining, by a processor, a speed and a direction of the moving electronic device based on strength differences in Bluetooth signals received by a plurality of directional antennas of the system from the moving electronic device;

adjusting, by the processor, a movement path of the system based on the determined speed and direction of the moving electronic device;

determining, by the processor, a distance between the moving electronic device and the system;

commanding, by the processor, the system to follow the moving electronic device within a predetermined range of the distance;

identifying, by the processor, an obstacle in the movement path of the system;

commanding, by the processor, the system to stop for a predetermined time period when the obstacle is identified;

determining, by the processor, whether the obstacle is still in the movement path of the system after the predetermined time period;

adjusting, by the processor, the movement path of the system, when determining the obstacle is still in the movement path; and commanding, by the processor, the system to continue to follow the moving electronic device within the predetermined range of the distance, when determining the obstacle is no longer in the movement path of the predetermined time period.

14. The method of claim 13 further comprising Bluetooth pairing, by the processor, with the moving electronic device and following only the moving electronic device after Bluetooth pairing.

15. The method of claim 13, wherein commanding the system to stop is based on a predetermined threshold of distance between the system and the obstacle.

16. The method of claim 13, wherein commanding the system to follow the moving electronic device within a predetermined range of the distance is based on a speed and a direction of the system.

17. The method of claim 16, further comprising increasing, by the processor, the speed of the system, when the system is being physically pulled at a predetermined angle with respect to ground.

18. The method of claim 13 further comprising rotating, by the processor, a plurality of omni wheels of the system by 180 degrees, when the moving electronic device is at a predetermined angle with respect to the system.

19. The method of claim 13, further comprising adjusting, by the processor, the speed and rotation angles of the system to change direction of the movement path.

20. The method of claim 13, wherein the system is one or more of a suitcase, a bag, a cargo, a stroller, a carriage, and a container.

* * * * *